US006887586B2

(12) United States Patent
Peker et al.

(10) Patent No.: US 6,887,586 B2
(45) Date of Patent: May 3, 2005

(54) SHARP-EDGED CUTTING TOOLS

(75) Inventors: Atakan Peker, Aliso Viejo, CA (US); Scott Wiggins, Tampa, FL (US)

(73) Assignee: Liquidmetal Technologies, Lake Forest, CA (US)

( * ) Notice: Subject to any disclaimer, the term of this patent is extended or adjusted under 35 U.S.C. 154(b) by 0 days.

(21) Appl. No.: 10/093,245

(22) Filed: Mar. 7, 2002

(65) Prior Publication Data

US 2002/0142182 A1 Oct. 3, 2002

Related U.S. Application Data

(60) Provisional application No. 60/274,339, filed on Mar. 7, 2001.

(51) Int. Cl.[7] .......................... B32B 15/00; B32B 15/04; B26B 1/00; B26B 9/00; B26B 21/58

(52) U.S. Cl. ......................... 428/600; 428/606; 428/655; 428/660; 428/667; 428/681; 428/686; 428/544; 428/192; 30/345; 30/346.53; 30/346.54; 30/350

(58) Field of Search .............................. 30/345, 346.53, 30/346.54, 350; 428/600, 602, 606, 607, 655, 660, 661, 662, 663, 667, 668, 678, 681, 682, 686, 687, 544, 548, 192, 220, 332

(56) References Cited

U.S. PATENT DOCUMENTS

| | | | | |
|---|---|---|---|---|
| 3,871,836 A | | 3/1975 | Polk et al. | |
| 4,067,732 A | * | 1/1978 | Ray | 75/126 P |
| 4,116,682 A | * | 9/1978 | Polk et al. | 75/123 H |
| 4,144,058 A | * | 3/1979 | Chen et al. | 75/170 |
| RE29,989 E | | 5/1979 | Polk et al. | |
| 4,387,698 A | | 6/1983 | Bustany | |
| 4,743,513 A | * | 5/1988 | Scruggs | 428/668 |
| 5,288,344 A | | 2/1994 | Peker et al. | |

(Continued)

FOREIGN PATENT DOCUMENTS

| | | |
|---|---|---|
| JP | 54 079103 | 6/1979 |
| JP | 2001303218 | 10/2001 |
| WO | WO 90/11724 | 10/1990 |

OTHER PUBLICATIONS

Hays et al., "Microstructure Controlled Shear Band Pattern Formation and Enhanced Plasticity of Bulk Metallic Glasses Containing in Situ Formed Ductile Phase Dendrite Dispersions," *Physical Review Letters*, Mar. 27, 2000, pp. 2901–2904, vol. 84, No. 13, The American Physical Society.

Inoue et al., "Bulk Amorphous Alloys with High Mechanical Strength and Good Soft Magnetic Properties in Fe–TM–B (TM=IV–VIII Group Transition Metal) System," *App. Phys. Lett.*, Jul. 28, 1997, pp. 464–466, vol. 71, No. 4, American Institute of Physics.

Shen et al., "Bulk Glassy $Co_{43}Fe_{20}Ta_{5.5}B_{31.5}$ Alloy with High Glass–Forming Ability and Good Soft Magnetic Properties," *Materials Transactions*, 2001, pp. 2136–2139, vol. 42, No. 10, Rapid Publication, (no month).

Suryanarayana, "Non–Equilibrioum Processing of Materials" Pergamon, Oxford, XP002281146, 1999, pg. 143 (no month).

Rao, X et al., "Foundation of Bulk Amorphous Alloy Database" Intermetallics, Elsevier Science Publishers, B.V. GB, vol. 8, No.. 5–6, May 2000, pp. 499–501, XP004207617.

European Search Report for corresponding EPO Patent application No. 02768276, 6 page.

*Primary Examiner*—Michael La Villa
(74) *Attorney, Agent, or Firm*—Christie, Parker & Hale, LLP

(57) ABSTRACT

Sharp-edged cutting tools and a method of manufacturing sharp-edged cutting tools wherein at least a portion of the sharp-edged cutting tool is formed from a bulk amorphous alloy material are provided.

16 Claims, 2 Drawing Sheets

U.S. PATENT DOCUMENTS

| | | | | | |
|---|---|---|---|---|---|
| 5,306,463 | A | | 4/1994 | Horimura | |
| 5,314,417 | A | | 5/1994 | Stephens et al. | |
| 5,324,368 | A | | 6/1994 | Masumoto et al. | |
| 5,368,659 | A | | 11/1994 | Peker et al. | |
| 5,477,616 | A | | 12/1995 | Williams et al. | 30/350 |
| 5,618,359 | A | | 4/1997 | Lin et al. | |
| 5,653,032 | A | | 8/1997 | Sikka | |
| 5,711,363 | A | | 1/1998 | Scruggs et al. | |
| 5,735,975 | A | | 4/1998 | Lin et al. | |
| 5,896,642 | A | | 4/1999 | Peker et al. | |
| 5,950,704 | A | | 9/1999 | Johnson et al. | |
| 6,200,685 | B1 | | 3/2001 | Davidson | 428/472.1 |
| 6,233,830 | B1 | * | 5/2001 | Lamond et al. | 30/123 |
| 6,325,868 | B1 | | 12/2001 | Kim et al. | |
| 2002/0174549 | A1 | * | 11/2002 | Nakatsu et al. | 30/346.54 |

* cited by examiner

SHARP-EDGED CUTTING TOOLS

CROSS-REFERENCE TO RELATED APPLICATION

This application is based on U.S. Application No. 60/274,339, filed Mar. 7, 2001, the disclosure of which is incorporated by reference.

FIELD OF THE INVENTION

This invention is related to cutting tools constructed of bulk solidifying amorphous alloys, and more particularly to the blades of cutting tools constructed of bulk solidifying amorphous alloys.

BACKGROUND OF THE INVENTION

It has long been known that the primary engineering challenges for producing effective sharp-edged cutting tools are the shaping and manufacturing of an effective sharp edge, the durability of the sharp edge against mechanical loads and environmental effects, and the cost of producing and maintaining sharp edges. As such, optimally the blade material should have very good mechanical properties, corrosion resistance, and the ability to be shaped into tight curvatures as small as 150 Angstroms.

Although sharp-edged cutting tools are produced from a variety of materials, each have significant disadvantages. For example, sharp-edged cutting tools produced from hard materials such as carbides, sapphire and diamonds provide sharp and effective cutting edges, however, these materials have a substantially higher manufacturing cost. In addition, cutting edges of blades made from these materials are extremely fragile due to the materials intrinsically low toughness.

Sharp-edged cutting tools made of conventional metals, such as stainless steel, can be produced at relatively low cost and can be used as disposable items. However, the cutting performance of these blades does not match that of the more expensive high hardness materials.

More recently it has been suggested to produce cutting tools made from amorphous alloys. Although amorphous alloys have the potential to provide blades having high hardness, ductility, elastic limit, and corrosion resistance at a relatively low cost, thus far the size and type of blade that can be produced with these materials has been limited by the processes required to produce alloys having amorphous properties. For example, cutting blades made with amorphous alloy are described in U.S. Pat. No. Re.29,989. However, the alloys described in the prior art must either be manufactured in strips with thicknesses no greater than 0.002 inch, or deposited on the surface of a conventional blade as a coating. These manufacturing restrictions limit both the types of blades that can be made from amorphous alloys and the full realization of the amorphous properties of these alloys.

Accordingly, there is a need for a cutting blade having good mechanical properties, corrosion resistance, and the ability to be shaped into tight curvatures as small as 150 Angstroms

SUMMARY OF THE INVENTION

The subject of the present invention is improved sharp-edged cutting tools, such as blades and scalpels made of bulk solidifying amorphous alloys. The invention covers any cutting blade or tool requiring enhanced sharpness and durability.

In one embodiment, the entire blade of the cutting tool is made of a bulk amorphous alloys.

In another embodiment, only the metallic edge of the blade of the cutting tool is made of a bulk amorphous alloys.

In yet another embodiment, both the blade and the body of the cutting tool are made of a bulk amorphous alloy.

In still another embodiment, the bulk solidifying amorphous alloy elements of the cutting tool are designed to sustain strains up to 2.0% without any plastic deformation. In another such embodiment the bulk amorphous alloy has a hardness value of about 5 GPa or more.

In still yet another embodiment of the invention, the bulk amorphous alloy blades of the cutting tools are shaped into tight curvatures as small as 150 Angstroms.

In still yet another embodiment of the invention, the bulk amorphous alloys are formed into complex near-net shapes either by casting or molding. In still yet another embodiment, the bulk amorphous alloy cutting tools are obtained in the cast and/or molded form without any need for subsequent process such as heat treatment or mechanical working.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

The present invention is directed to cutting tools wherein at least a portion of the device is formed of a bulk amorphous alloy material, referred to herein as amorphous cutting tools.

Figure 1:
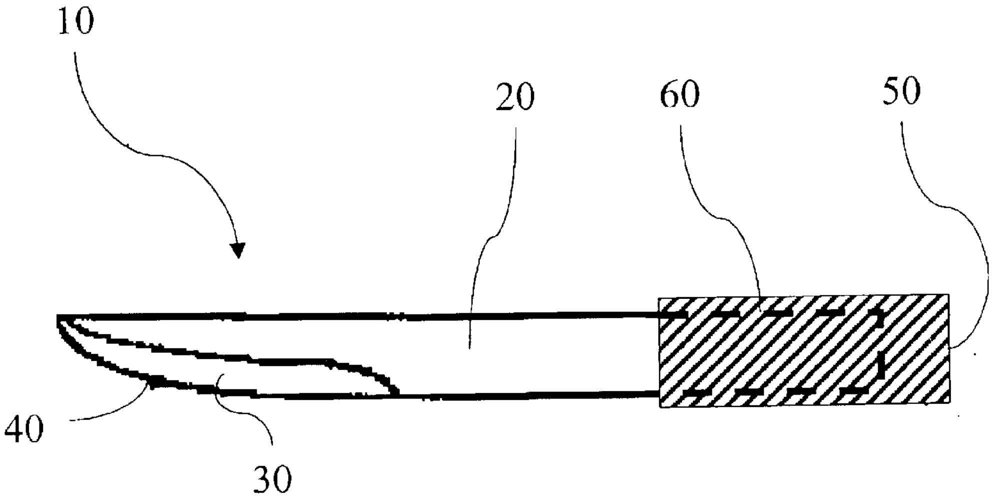
FIG. 1 is a partial cross-sectional side view of a cutting blade in accordance with the present invention.
Figure 2:
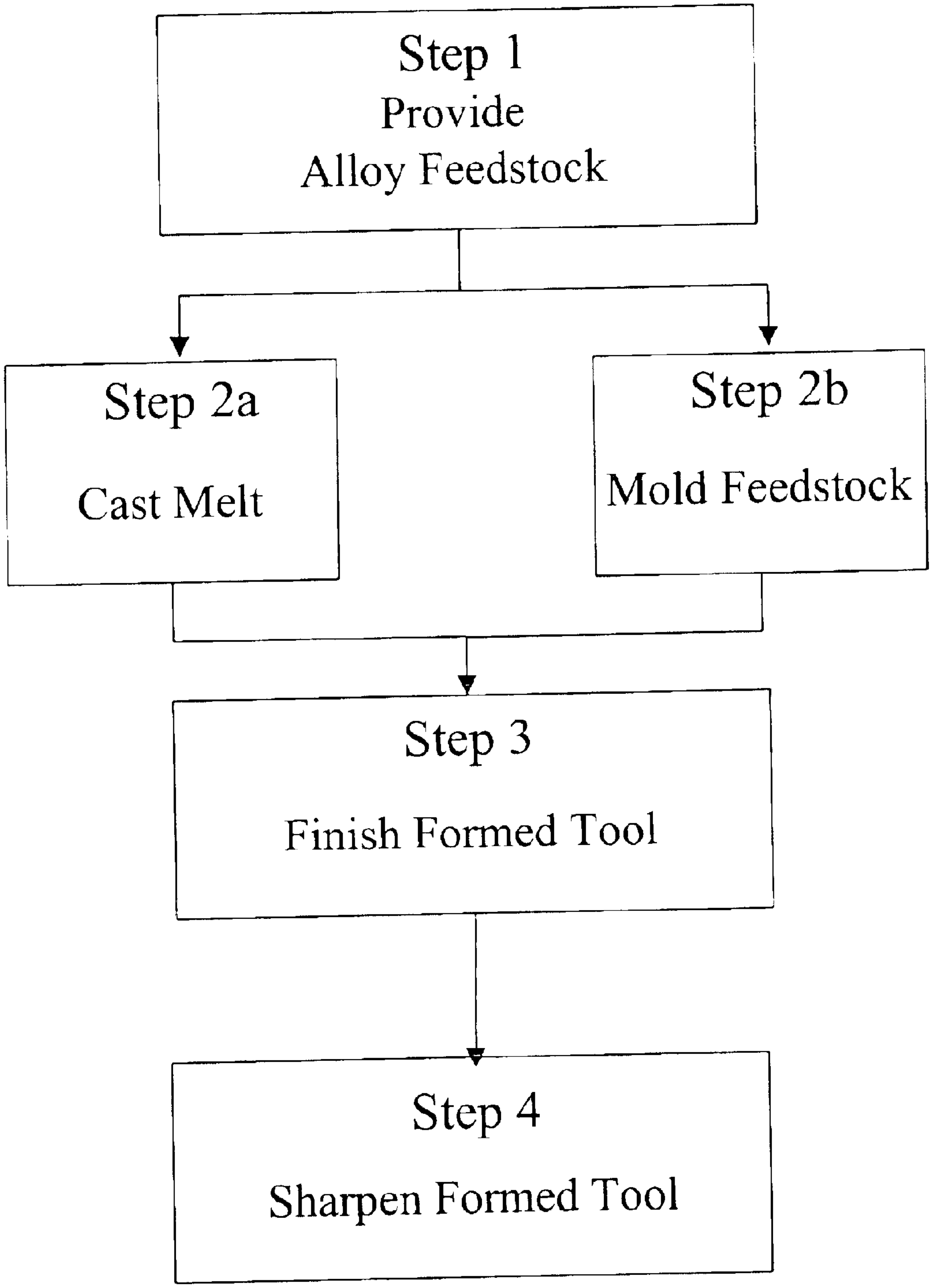
FIG. 2 shows a flow-chart of a process for making the cutting tool shown in FIG. 1.

Shown in FIG. 1 is a side view of a cutting tool 10 of the present invention. In general any cutting tool has a body 20 and a blade 30. In such cutting tools the blade 30 is defined as that portion of the cutting tool which tapers to a terminating cutting edge 40, while the body 20 of the cutting tool is defined as the structure that transfers an applied load from the cutting tool driving force to the cutting edge 40 of the blade. In addition, as shown in FIG. 1, a cutting tool may include an optional handle or grip 50 which serves as a stable interface between the cutting tool user and the cutting tool. In such a case the portion of the body 20 to which the handle is attached is called the shank 60. The cutting tool of the present invention is designed such that the material for fabricating at least a portion of either the body, blade or both of the cutting tool is based on bulk-amorphous-alloy compositions. Examples of suitable bulk-amorphous-alloy compositions are discussed below.

Although any bulk amorphous alloys may be used in the current invention, generally, bulk solidifying amorphous alloys refer to the family of amorphous alloys that can be cooled at cooling rates of as low as 500 K/sec or less, and retain their amorphous atomic structure substantially. Such bulk amorphous alloys can be produced in thicknesses of 1.0 mm or more, substantially thicker than conventional amorphous alloys having a typical cast thickness of 0.020 mm, and which require cooling rates of $10^5$ K/sec or more. Exemplary embodiments of suitable amorphous alloys are disclosed in U.S. Pat. Nos. 5,288,344; 5,368,659; 5,618,359; and 5,735,975; all of which are incorporated herein by reference.

One exemplary family of suitable bulk solidifying amorphous alloys are described by the following molecular formula: $(Zr,Ti)_a(Ni,Cu, Fe)_b(Be,Al,Si,B)_c$, where a is in the range of from about 30 to 75, b is in the range of from about 5 to 60, and c in the range of from about 0 to 50 in atomic percentages. It should be understood that the above formula by no means encompasses all classes of bulk amorphous alloys. For example, such bulk amorphous alloys can accommodate substantial concentrations of other transition metals, up to about 20% atomic percentage of transition metals such as Nb, Cr, V, Co. One exemplary bulk amorphous alloy family is defined by the molecular formula: $(Zr,Ti)_a(Ni,Cu)_b(Be)_c$, where a is in the range of from about 40 to 75, b is in the range of from about 5 to 50, and c in the range of from about 5 to 50 in atomic percentages. One exemplary bulk amorphous alloy composition is $Zr_{41}Ti_{14}Ni_{10}Cu_{12.5}Be_{22.5}$.

Although specific bulk solidifying amorphous alloys are described above, any suitable bulk amorphous alloy may be used which can sustain strains up to 1.5% or more without any permanent deformation or breakage; and/or have a high fracture toughness of about 10 ksi-√in or more, and more specifically of about 20 ksi-√in or more; and/or have high hardness values of about 4 GPa or more, and more specifically about 5.5 GPa or more. In comparison to conventional materials, suitable bulk amorphous alloys have yield strength levels of up to about 2 GPa and more, exceeding the current state of the Titanium alloys. Furthermore, the bulk amorphous alloys of the invention have a density in the range of 4.5 to 6.5 g/cc, and as such they provide high strength to weight ratios. In addition to desirable mechanical properties, bulk solidifying amorphous alloys exhibit very good corrosion resistance.

Another set of bulk-solidifying amorphous alloys are compositions based on ferrous metals (Fe, Ni, Co). Examples of such compositions are disclosed in U.S. Pat. No. 6,325,868, (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. # 0.2001303218 A), incorporated herein by reference. One exemplary composition of such alloys is $Fe_{72}Al_5Ga_2P_{11}C_6B_4$. Another exemplary composition of such alloys is $Fe_{72}Al_7Zr_{10}MO_5W_2B_{15}$. Although, these alloy compositions are not as processable as Zr-base alloy systems, these materials can be still be processed in thicknesses around 0.5 mm or more, sufficient enough to be utilized in the current disclosure. In addition, although the density of these materials is generally higher, from 6.5 g/cc to 8.5 g/cc, the hardness of the materials is also higher, from 7.5 GPA to 12 GPa or more making them particularly attractive. Similarly, these materials have elastic strain limit higher than 1.2% and very high yield strengths from 2.5 GPa to 4 GPa.

In general, crystalline precipitates in bulk amorphous alloys are highly detrimental to their properties, especially to the toughness and strength, and as such generally preferred to a minimum volume fraction possible. However, there are cases in which ductile metallic crystalline phases precipitate in-situ during the processing of bulk amorphous alloys. These ductile precipitates can be beneficial to the properties of bulk amorphous alloys especially to the toughness and ductility. Accordingly, bulk amorphous alloys comprising such beneficial precipitates are also included in the current invention. One exemplary case is disclosed in (C. C. Hays et. al, Physical Review Letters, Vol. 84, p 2901, 2000), which is incorporated herein by reference.

In one embodiment of the invention at least the blade 30 of the cutting tool is formed from one of the bulk amorphous alloys material described above. In such an embodiment, although any size and shape of knife blade may be manufactured, it is desirable that the sharp cutting edges 40 of the cutting tool have a radius of curvature as small as possible for a high performing operation. As a bench mark, diamond scalpel blades can be produced with an edge radius of curvature less than 150 Angstroms. However, conventional materials pose several obstacles during the process of shaping a cutting edge with such a small radius. Conventional materials, such as stainless steel, have a polycrystalline atomic structure, which is composed of small crystalline grains oriented in varying orientations. Because of the nonisotropic nature of these crystalline structures, the different grains in the material respond differently to the shaping operations, as such, the shaping and manufacture of highly effective sharp edges from such crystalline materials is either compromised or requires significant additional processing raising the cost of the finished cutting tool. Because bulk solidifying amorphous alloys do not have a crystalline structure, they respond more uniformly to conventional shaping operations, such as lapping, chemical, and high energy methods. Accordingly, in one embodiment the invention is directed to cutting tools having blades made of a bulk amorphous alloy material wherein the cutting edge 40 of the blade 30 has a radius of curvature of about 150 Angstroms or less.

Because of the small radius of curvature of the cutting edges 40 of these cutting tools, the edges have a low degree of stiffness, and are therefore subject to high levels of strain during operation. For example, cutting edges made of conventional metals, such as stainless steel, sustain large strains only by plastic deformation hence losing their sharpness and flatness. In fact, conventional metals start deforming plastically at strain levels of 0.6% or less. On the other hand, cutting edges made of hard materials, such as diamond, do not deform plastically, instead they chip off due to their intrinsically low fracture toughness, as low as 1 or less ksi-sqrt(in), which limits their ability to sustain strains over 0.6%. In contrast, due to their unique atomic structure amorphous alloys have an advantageous combination of high hardness and high fracture toughness, therefore, cutting blades made of bulk solidifying amorphous alloys can easily sustain strains up to 2.0% without any plastic deformation or chip-off. Further, the bulk amorphous alloys have higher fracture toughness in thinner dimensions (less than 1.0 mm) which makes them especially useful for sharp-edge cutting tools. Accordingly, in one embodiment the invention is directed to cutting tool blades capable of sustaining strains of greater than 1.2%.

Although the previous discussion has focussed on the use of bulk solidifying amorphous alloys in the blade portion of cutting tools, it should be understood that bulk solidifying amorphous alloys can also be used as the supporting portion of the blades such as the body 20 of a knife or scalpel 10 as shown in FIG. 1. Such a construction is desirable because in cutting tools where the sharp edge has a different microstructure (for higher hardness) than the microstructure of the body support (which provide higher toughness though at substantially lower hardness), once the sharp edge becomes dull, and/or resharpened a few times, the blade material is consumed and the cutting tool must be discarded. In addition, using a single material for both the body and blade reduces the likelihood of the different materials suffering corrosion, such as through galvanic action. Finally, since the body and blade of the cutting tool are one piece, no additional structure is needed to attach the blade to the body so there is a more solid and precise transfer of force to the blade, and, therefore, a more solid and precise feel for the user. Accordingly, in one embodiment the invention is directed to a cutting tool in which both the blade and the support body is made of a bulk amorphous alloys material.

In addition, in those cases in which a handle is formed on the body of the cutting tool, although other materials may be mounted to the body of the cutting tool to serve as a handle grip 50, such as plastic, wood, etc., the handle and body may also be constructed as a single piece made of a bulk amorphous alloy. Furthermore, although the embodiment of the cutting tool shown in FIG. 1 shows a traditional longitudinal knife body 20 with a handle 50 attached on a long shank 60 at the end of the body opposite the blade 30, any body configuration may be made and, likewise, the handle may be positioned anywhere on the body of the cutting tool such that force applied from a user can be transmitted through the handle to the body to the blade and cutting edge of the cutting tool.

Although cutting tools made of bulk amorphous alloys are described above, the sharp-edges of the cutting tools can be made to have a higher hardness and greater durability by applying coatings of high hardness materials such as diamond, TiN, SiC with thickness of up to 0.005 mm. Because bulk solidifying amorphous alloys have elastic limits similar to thin films of high hardness materials, such as diamond, SiC, etc., they are more compatible and provide a highly effective support for those thin coatings such that the hardened coating will be protected against chip-off. Accordingly, in one embodiment the invention is directed to cutting tools in which the bulk amorphous alloy blades further include a ultra-high hardness coating (such diamond or SiC) to improve the wear performance.

Although no finished cutting tools are discussed above, it should be understood that the bulk amorphous alloy can be further treated to improve the cutting tools' aesthetics and colors. For example, the cutting tool may be subject to any suitable electrochemical processing, such as anodizing (electrochemical oxidation of the metal). Since such anodic coatings also allow secondary infusions, (i.e. organic and inorganic coloring, lubricity aids, etc.), additional aesthetic or functional processing could be performed on the anodized cutting tools. Any suitable conventional anodizing process may be utilized.

The invention is also directed to methods of manufacturing cutting tools from bulk amorphous alloys. FIG. 3 shows a flow-chart for a process of forming the amorphous alloy articles of the invention comprising: providing a feedstock (Step 1), in the case of a molding process, this feedstock is a solid piece in the amorphous form, while in the case of a casting process, this feedstock is a molten liquid alloy above the melting temperatures; then either casting the feedstock from at or above the melt temperature into the desired shape while cooling (Step 2*a*), or heating the feedstock to the glass transition temperature or above and molding the alloy into the desired shape (Step 2*b*). Any suitable casting process may be utilized in the current invention, such as, permanent mold casting, die casting or a continuous process such as planar flow casting. One such diecasting process is disclosed in U.S. Pat. No. 5,711,363, which is incorporated herein by reference. Likewise, a variety of molding operations can be utilized, such as, blow molding (clamping a portion of feedstock material and applying a pressure difference on opposite faces of the unclamped area), die-forming (forcing the feedstock material into a die cavity), and replication of surface features from a replicating die. U.S. Pat. Nos. 6,027,586; 5,950,704; 5,896,642; 5,324,368; 5,306,463; (each of which is incorporated by reference in its entirety) disclose methods to form molded articles of amorphous alloys by exploiting their glass transition properties. Although subsequent processing steps may be used to finish the amorphous alloy articles of the current invention (Step 3), it should be understood that the mechanical properties of the bulk amorphous alloys and composites can be obtained in the as cast and/or molded form without any need for subsequent process such as heat treatment or mechanical working. In addition, in one embodiment the bulk amorphous alloys and their composites are formed into complex near-net shapes in the two-step process. In such an embodiment, the precision and near-net shape of casting and moldings is preserved.

Finally, the cutting tool blades are rough machined to form a preliminary edge and the final sharp edge is produced by one or more combinations of the conventional lapping, chemical and high energy methods (Step 4). Alternatively, the cutting tool (such as knives and scalpels) can be formed from an amorphous alloy blank. In such a method sheets of amorphous alloy material are formed in Steps 1 and 2, and then blanks are cut from the sheets of bulk amorphous alloys 1.0 mm or more thickness in Step 3 prior to the final shaping and sharpening.

Although only a relatively simple single blade knife-like cutting tool is shown in FIG. 1, it should be understood that utilizing such a near-net shape process for forming structures made of the bulk amorphous metals and composites, more sophisticated and advanced designs of cutting tools having the improved mechanical properties could be achieved.

For example, in one embodiment the invention is directed to a cutting tool in which the thickness and or boundary of the cutting edge varies to form a serration. Such a serration can be formed by any suitable technique, such as by a grinding wheel having an axis parallel to the cutting edge. In such a process the grinding wheel cuts back the surface of the metal along the cutting edge. This adds jaggedness to the cutting edge as shown forming protruding teeth such that the cutting edge has a saw tooth form. Alternatively, the serrations may be formed in the molding or casting process. This method has the advantage of making the serrations in a one-step. A cutting tool having a serrated edge may be particularly effective in some types of cutting applications. Moreover the cutting ability of such a cutting tool is not directly dependant on the sharpness of the cutting edge so that the cutting edge is able to cut effectively even after the cutting edge wears and dulls somewhat.

Although specific embodiments are disclosed herein, it is expected that persons skilled in the art can and will design alternative amorphous alloy cutting tools and methods to produce the amorphous alloy cutting tools that are within the scope of the following claims either literally or under the Doctrine of Equivalents.

What is claimed is:

1. A cutting tool comprising:

a blade portion having a sharpened edge and a body portion;

wherein at least one of the blade portion and the body portion are formed from a bulk amorphous alloy material, and where at least one portion of the bulk amorphous alloy material has a thickness of at least 0.5 mm.

2. The cutting tool as described in claim 1, wherein the bulk amorphous alloy is described by the following molecular formula:

$(Zr,Ti)_a(Ni,Cu)_b(Be)_c$, wherein "a" is in the range of from about 40 to 75, "b" is in the range of from about 5 to 50, and "c" in the range of from about 5 to 50 in atomic percentages.

3. The cutting tool as described in claim 1, wherein the bulk amorphous alloy is described by the following molecular formula:

$Zr_{41}Ti_{14}Ni_{10}Cu_{12.5}Be_{22.5}$.

4. The cutting tool as described in claim 1, wherein the bulk amorphous alloy has an elastic limit of at least about 1.2%.

5. The cutting tool as described in claim 1, wherein the bulk amorphous alloy is based on iron, cobalt, and/or nickel wherein the elastic limit of the bulk amorphous alloy is about 1.2% and higher.

6. The cutting tool as described in claim 1, wherein the bulk amorphous alloy is described by a molecular formula selected from the group consisting of: $Fe_{72}Al_5Ga_2P_{11}C_6B_4$ and $Fe_{72}Al_7Zr_{10}Mo_5W_2B_{15}$.

7. The cutting tool as described in claim 1, wherein the at least one portion formed from the bulk amorphous alloy has an elastic limit of at least about 2.0%.

8. The cutting tool as described in claim 1, wherein the bulk amorphous alloy further comprises a ductile metallic crystalline phase precipitate.

9. The cutting tool as described in claim 1, further comprising a handle mounted onto the body portion.

10. The cutting tool as described in claim 9, wherein the handle is formed from a material selected from the group consisting of: a plastic, a metal and wood.

11. The cutting tool as described in claim 1, wherein at least the blade portion is formed from the bulk amorphous alloy.

12. The cutting tool as described in claim 1, wherein the sharpened edge is formed from a bulk amorphous alloy and has a radius of curvature of about 150 Angstroms or less.

13. The cutting tool as described in claim 1, wherein the blade portion is further coated with a high-hardened material selected from the group consisting of: TiN, SiC and diamond.

14. The cutting tool as described in claim 1, wherein the cutting tool is anodized.

15. The cutting tool as described in claim 1, wherein the cutting tool is in the form of one of either a knife or a scalpel.

16. The cutting tool as described in claim 1, wherein the sharpened edge is serrated.

* * * * *